United States Patent [19]

Sauntson

[11] 4,333,867
[45] Jun. 8, 1982

[54] CERAMIC TILE ADHESIVES

[75] Inventor: Barry J. Sauntson, Higham Ferrers, England

[73] Assignee: Scott Bader Company Limited, Northamptonshire, England

[21] Appl. No.: 236,725

[22] Filed: Feb. 23, 1981

[30] Foreign Application Priority Data

Mar. 3, 1980 [GB] United Kingdom ................. 8007092

[51] Int. Cl.$^3$ ............................................. C08L 43/04
[52] U.S. Cl. ..................................... 524/547; 526/279
[58] Field of Search ........................ 260/29.6 T, 42.26; 526/279

[56] References Cited

U.S. PATENT DOCUMENTS 4,039,463  8/1977  Roo et al. ............................ 526/279

FOREIGN PATENT DOCUMENTS 1127625  9/1965  United Kingdom .
1200756  8/1967  United Kingdom .
1205051  8/1967  United Kingdom .
1306935  6/1969  United Kingdom .

Primary Examiner—Joseph L. Schofer
Assistant Examiner—Sarofim N.
Attorney, Agent, or Firm—Pearne, Gordon, Sessions, McCoy & Granger

[57] ABSTRACT

An adhesive for the efficient bonding of ceramic tiles and having improved water resistance comprises an emulsion copolymer composition including an acrylate or methacrylate monomer, a vinyl aromatic monomer, and, for reducing water sensitivity, an unsaturated organo-silicon compound. Compositions which are effective in promoting water resistant adhesion may contain as little as from 0.1–1.0% by weight of the unsaturated organosilicon compound.

9 Claims, No Drawings

CERAMIC TILE ADHESIVES

FIELD OF THE INVENTION

This invention relates to ceramic tile adhesives.

BACKGROUND OF THE INVENTION

The earliest method of sticking ceramic tiles was to use an hydraulic cement. Since then adhesives based on 100% reactive resin systems such as epoxide or unsaturated polyester resins, solvent solutions or acrylic polymers or elastomers, natural rubber latices, synthetic rubber latices, polyvinyl acetate or copolymer emulsions and acrylic copolymer emulsions have all become available.

Besides all the applicational properties required e.g. open time (i.e. time during which the adhesive remains workable), slip, speed of drying and suitable rheology, ceramic tile adhesives should have good resistance to wet conditions. One method of testing this is to carry out shear tests after sticking two tiles together and immersing them in water for 7 days as described in B.S. 5385: Part 1: 1976: Section A5.8.

In general those adhesives based on non-aqueous systems e.g. epoxy resins show up best on this test. However, it is desirable on ground of cost and safety to use aqueous based systems but these usually have very inferior properties.

B.P. 1,407,827 discloses the use of unsaturated organo-silicon compounds as co-monomers in polyvinyl ester copolymer emulsions. However it is well known that many polyvinyl esters especially polyvinyl acetate are prone to hydrolysis.

SUMMARY OF THE INVENTION

We now find that certain copolymer emulsions modified by the use of unsaturated organo-silicon compounds can be used as the basis of ceramic tile adhesives which provide excellent resistance to water.

The monomers of the copolymer emulsions are vinyl aromatic monomers and acrylate or methacrylate monomers. The acrylate and methacrylate monomers are expensive and the use of the vinyl aromatic monomers reduces the cost of the final product.

The acrylates or alkacrylates may in particular be $C_1$-$C_8$ alkyl esters of acrylic or methyacrylic acid but the invention is not limited to these. For instance $C_9$ and higher alkyl esters might be employed, as might ethacrylates and higher acrylate homologues.

Typical acrylates/methacrylates which can be used in the polymers are methyl acrylate, ethyl acrylate, propyl acrylate, butyl acrylate, 2-ethyl hexyl acrylate, heptyl acrylate and the corresponding methacrylates.

The vinyl aromatic monomer used in a copolymer emulsion composition of the invention may, for example, be styrene, vinyl toluene, chlorostyrene or t-butyl styrene.

It is also advantageous to use, as an additional component, small proportions (up to 10% by weight) of an unsaturated organic, e.g acrylic or methacrylic acid in the copolymer.

Typical unsaturated organo-silicon compounds are γ-methacryloxypropyl trimethoxy silane, vinyl triethoxy silane and vinyl trimethoxy silane.

Although the unsaturated organo-silicon monomers are rather expensive, we find that, by using a technique of emulsion polymerization only very low quantities, i.e. from 0.1-1.0% by weight of unsaturated organo-silicon compounds, need be added to be effective in promoting water resistant adhesion.

DESCRIPTION OF PREFERRED EMBODIMENTS

Preferred compositions embodying the invention will now be described with reference to the following Examples, which include an example of a known composition (Example 5) for comparison.

EXAMPLE 1

A styrene/ethyl acrylate/acrylic acid copolymer emulsion was prepared using 384 g of a mixed monomer feed (39.7, 59.6, 0.7% by weight respectively) fed to a reaction vessel. The temperature was maintained at 60°±2° C. until polymerization was complete, using a redox system. 56.8 g of a mixture of styrene, acrylic acid and γ-methacryloxypropyl trimethoxy silane (81.3, 16.9, 1.8% by weight respectively) was then added to the polymer emulsion and polymerised under similar conditions. By this manner a shell of polymer containing Si-OH or Si-OCH$_3$ groups in the chain around a core of styrene/ethyl acrylate copolymer was obtained.

This emulsion had a solids content of 45%.

EXAMPLE 2

A ceramic tile adhesive was made by mixing the following:

| | |
|---|---|
| Shell/core emulsion as in Example 1 | 165.5 pbw |
| Foamaster ® 44 - antifoam | 1.0 pbw |
| Butyl carbitol - coalescing solvent | 7.5 pbw |
| Methocel ® J.12MA - thickener | 1.5 pbw |
| Water | 78.0 pbw |
| Proxel ® XL2 - preservative | 1.5 pbw |
| Microdol ® 200 - filler | 745.0 pbw |

When this adhesive was used to stick two tiles together as described in B.S. 5385: Part 1: 1976: Section A5.8, the shear strength was 0.9 MPa after 7 days immersion in water. This compares with 0.4 MPa minimum in the specification.

EXAMPLE 3

A styrene/butyl acrylate/acrylic acid/methacryloxypropyl triethoxy silane (55/42/2.8/0.2% by weight) copolymer emulsion was made using an anionic surfactant, pre-emulsified monomer feed and a redox polymerization system at 60° C. The pH of the final emulsion polymer was adjusted to pH 8.0-9.0 using ammonia and the solids content was adjusted to 45%.

EXAMPLE 4

A ceramic tile adhesive was made by mixing the following:

| | |
|---|---|
| Emulsion of Example 3 | 165.5 pbw |
| Foamaster ® 44 - antifoam | 1.0 pbw |
| Natrosol ® 250 HR - thickener | 3.0 pbw |
| Densil ® P - preservative | 2.0 pbw |
| Butyl diglycol acetate - coalescing agent | 4.0 pbw |
| 20% Calgon ® solution - dispersant | 1.0 pbw |
| Dispex ® G40 - dispersant | 1.5 pbw |
| Water | 167.0 pbw |
| Silica XPF3 - filler | 745.0 pbw |

When tested in the same way as the adhesive in Example 2 the shear strength was 0.7 MPa.

EXAMPLE 5

A ceramic tile adhesive was made up to the formulation shown in Example 4 except that an emulsion omitting the unsaturated silane component was used.

In this case the British Standard test gave a shear strength below the 0.4 MPa minimum requirement.

I claim:

1. An aqueous emulsion polymer composition for use as a ceramic tile adhesive, which composition contains a large quantity, based on the weight of solid polymer, of filler material and an emulsion polymer of at least one acrylate monomer selected from acrylates and methacrylates and at least one vinyl aromatic monomer, which emulsion polymer is prepared in the presence of at least one unsaturated organo-silicon compound to improve retention of adhesive strength of the adhesive composition on exposure to moisture.

2. An emulsion polymer composition according to claim 1 wherein the unsaturated organo-silicon compound is a vinyl or acrylic monomer capable of crosslinking with the vinyl aromatic monomer.

3. An emulsion polymer composition according to claim 2, wherein the unsaturated organo-silicon monomer is selected from the group consisting of γ-methacryloxypropyl trimethoxy silane, vinyl triethoxy silane and vinyl trimethoxy silane.

4. An emulsion polymer composition according to claim 3, wherein the amount of organo-silicon compound present in the composition is from 0.1–1.0% by weight based on the weight of the monomers.

5. An emulsion polymer composition according to claim 1, wherein the acrylate monomer is selected from the group consisting of methyl acrylate, ethyl acrylate, propyl acrylate, butyl acrylate, 2-ethyl hexyl acrylate, and heptyl acrylate.

6. An emulsion polymer composition according to claim 1, wherein the vinyl aromatic monomer is selected from styrene, vinyl toluene, chlorostyrene and t-butyl styrene.

7. An emulsion polymer composition according to claim 1, wherein the emulsion polymer additionally contains unsaturated organic acid monomer units in an amount by weight, based on the weight of solid polymer, of up to 10%.

8. An emulsion polymer as set forth in claim 1, wherein the amount of filler material in the composition is equal to about 10 times the amount of the solid polymer.

9. In an aqueous polymer composition for use as a ceramic tile adhesive containing a large quantity, based on the weight of emulsion polymer, of filler material and an emulsion polymer of at least one acrylate monomer selected from acrylates and methacrylates and at least one vinyl aromatic monomer, the improvement comprising including in the emulsion polymerization mixture at least one unsaturated organo-silicon compound.

* * * * *